United States Patent
Itoh et al.

(10) Patent No.: US 7,577,337 B2
(45) Date of Patent: Aug. 18, 2009

(54) AUDIO/VIDEO DATA RECORDING/REPRODUCING DEVICE AND METHOD, AND AUDIO/VIDEO DATA REPRODUCING DEVICE AND METHOD

(75) Inventors: Masanori Itoh, Osaka (JP); Masafumi Shimotashiro, Osaka (JP)

(73) Assignee: Panasonic Corporation, Osaka (JP)

( * ) Notice: Subject to any disclaimer, the term of this patent is extended or adjusted under 35 U.S.C. 154(b) by 879 days.

(21) Appl. No.: 10/381,867

(22) PCT Filed: Oct. 11, 2001

(86) PCT No.: PCT/JP01/08958

§ 371 (c)(1), (2), (4) Date: Mar. 28, 2003

(87) PCT Pub. No.: WO02/32130

PCT Pub. Date: Apr. 18, 2002

(65) Prior Publication Data

US 2003/0170009 A1   Sep. 11, 2003

(30) Foreign Application Priority Data

Oct. 12, 2000   (JP) .............................. 2000-311583

(51) Int. Cl.
H04N 7/26 (2006.01)
H04N 5/00 (2006.01)
H04N 5/40 (2006.01)
H04N 5/60 (2006.01)
H04N 5/91 (2006.01)
H04N 7/00 (2006.01)
H04N 7/20 (2006.01)
H04N 7/167 (2006.01)
H04N 7/173 (2006.01)
G06K 9/36 (2006.01)
G11B 7/00 (2006.01)
G11B 15/52 (2006.01)

(52) U.S. Cl. ........................... 386/111; 386/68; 386/95; 386/98; 386/125; 386/126; 348/484; 348/724; 348/738; 369/47.24; 369/53.22; 369/124.09; 382/236; 382/239; 725/31; 725/63; 725/116; 725/117; 725/131

(58) Field of Classification Search .................. 386/68, 386/95, 98, 111, 125, 126, E5.002; 382/236, 382/239; 725/116, 131, 31, 63, 117; 348/484, 348/724, 738, E5.002, E5.006, E5.008, E5.096, 348/E5.099, E5.1, E5.104; 369/47.24, 53.22, 369/124.09

See application file for complete search history.

(56) References Cited

U.S. PATENT DOCUMENTS 5,047,860 A * 9/1991 Rogalski ..................... 348/738

(Continued)

FOREIGN PATENT DOCUMENTS

EP    0 662 688 A1   7/1995

(Continued)

OTHER PUBLICATIONS

NAVCO Model 2700 S-VHS/VHS High Density VCR, Operating Instructions, 1995 NAVCO.*

Primary Examiner—Thai Tran
Assistant Examiner—Syed Y Hasan
(74) Attorney, Agent, or Firm—Hamre, Schumann, Mueller & Larson, P.C.

(57) ABSTRACT

An audio/video data recording/reproducing device is provided that allows all video and audio signals, which can be displayed by a display of the audio/video data recording/reproducing device proper, to be output to an exterior through a digital interface. Such audio/video signals are in the forms of, for example, files as recorded including a moving picture file, a still picture file, and a file resulting from synthesization of a moving picture file with a still picture file. When the digital interface of the recording/reproducing device is connected to a digital TV, a synthesized signal from a synthesizing part 117, after being encoded into an MPEG-TS in an encoder 103, is output from a 1394 interface part 121. When the digital interface is connected to another editor or recording device, a recording signal from a reproducing part 116 is output as it is from the 1394 interface part 121.

12 Claims, 4 Drawing Sheets

U.S. PATENT DOCUMENTS

| | | | |
|---|---|---|---|
| 5,541,638 A * | 7/1996 | Story | 725/116 |
| 5,682,195 A * | 10/1997 | Hendricks et al. | 725/31 |
| 5,689,486 A * | 11/1997 | Shimizu et al. | 369/47.24 |
| 5,771,333 A * | 6/1998 | Hirayama et al. | 386/85 |
| 6,195,503 B1 * | 2/2001 | Ikedo et al. | 386/104 |
| 6,782,193 B1 * | 8/2004 | Nakatani et al. | 386/126 |
| 6,856,756 B1 * | 2/2005 | Mochizuki et al. | 386/68 |
| 7,006,698 B2 * | 2/2006 | Adiletta et al. | 382/236 |
| 2007/0183757 A1 * | 8/2007 | Yaguchi et al. | 386/112 |

FOREIGN PATENT DOCUMENTS

| | | |
|---|---|---|
| JP | 10-285532 | 10/1998 |
| JP | 2000-059731 | 2/2000 |
| JP | 2001-169250 | 6/2001 |

\* cited by examiner

AUDIO/VIDEO DATA RECORDING/REPRODUCING DEVICE AND METHOD, AND AUDIO/VIDEO DATA REPRODUCING DEVICE AND METHOD

TECHNICAL FIELD

The present invention relates to an audio/video data recording/reproducing device and method for recording by compression, audio and video in the forms of a moving picture, a still picture and the like on a recording medium such as an optical disk or the like, and to an audio/video data reproducing device and method for reproducing by expansion, audio and video data recorded on a recording medium.

BACKGROUND ART

An audio/video data recording/reproducing device has been introduced that records by compression, moving pictures and still pictures on a recording medium such as an optical disk or the like. Moving pictures are recorded in a format of an MPEG file consisting of an MPEG system stream by MPEG-2 (system) compression defined in ISO/IEC 13818-1. Still pictures are recorded in a format of a JPEG file after being subjected to JPEG compression. A video signal in the MPEG file is compressed according to the MPEG-2 (Video) standard defined in ISO/IEC 13818-3, while an audio signal is subjected to MPEG-1 Layer 2 compression, MPEG-2 ACC (Advanced Audio Cording), AC3 compression or the like and arranged in the MPEG system stream.

Figure 2:
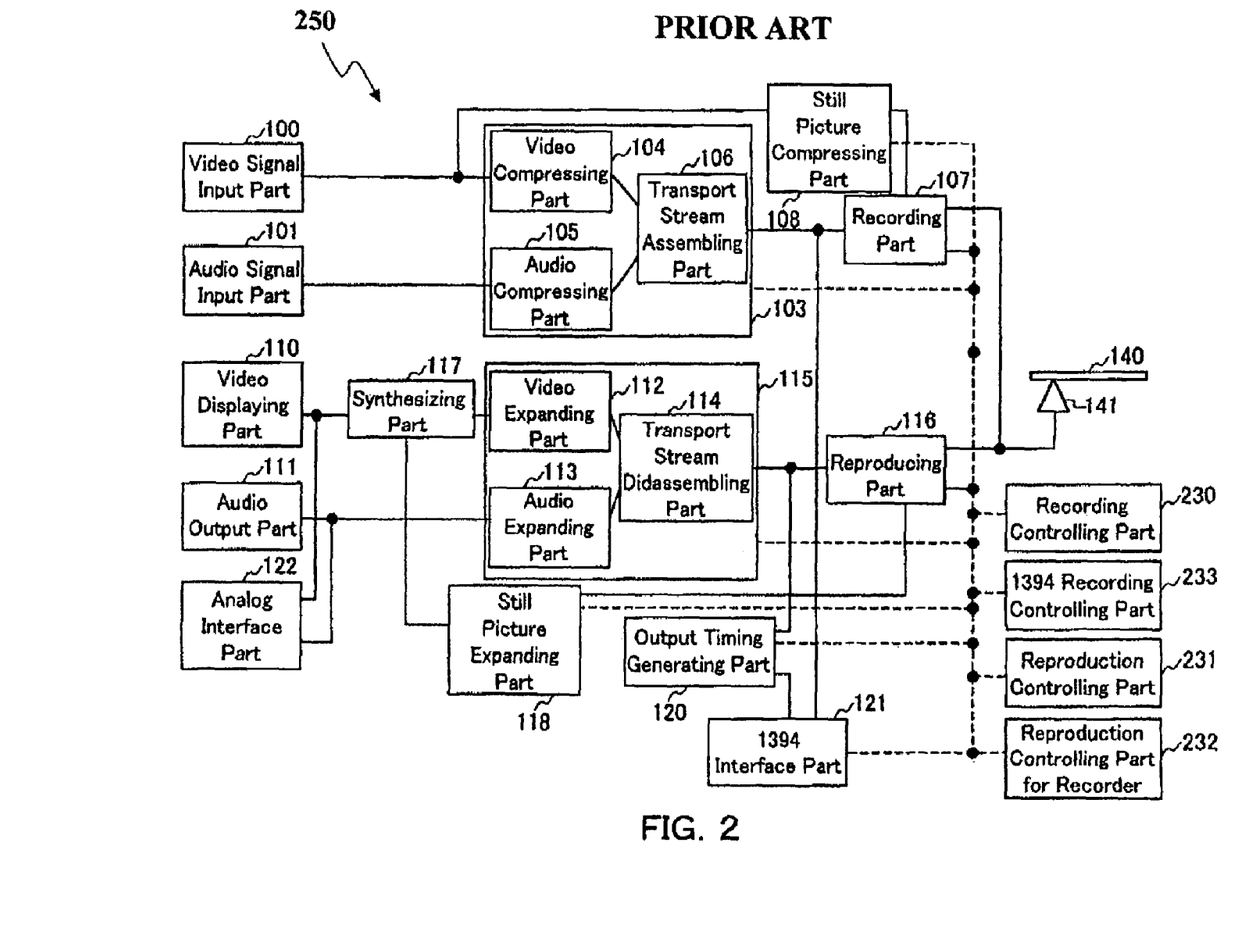
FIG. 2 is a block diagram showing an example of a configuration of a conventional audio/video data recording/reproducing device.

FIG. 2 is a block diagram showing an example of a configuration of a conventional audio/video data recording/reproducing device. A switching operation allows a user to perform recording of moving pictures input from a video signal input part 100 and an audio signal input part 101 and further to perform recording of transport streams input from a 1394 interface part 121. When recording a video signal and an audio signal of a moving picture, the signals input from the video signal input part 100 and the audio signal input part 101 are compressed in a video compressing part 104 and an audio compressing part 105, respectively. Then, a transport stream is created in a transport stream assembling part 106 and written on a phase change optical disk 140 via a recording part 107 and a pickup 141. Meanwhile, a video signal of a still picture input from the video signal input part 100 is written on the phase change optical disk 140 via a still picture compressing part 108, the recording part 107 and the pickup 141. These operations are controlled by a recording controlling part 230. Management of an MPEG file and a JPEG file that are to be recorded is performed according to the UDF (Universal Disk Format) file system. When a command to record an MPEG transport stream (MPEG-TS) from the 1394 interface part 121 is issued, a 1394 recording controlling part 233 records the transport stream input from the exterior through the 1394 interface part 121 on the phase change optical disk 140 through the recording part 107 and the pickup 141.

When reproducing a video signal and an audio signal of a moving picture, a transport stream extracted via the pickup 141 and a reproducing part 116 is separated into a video packet and an audio packet in a transport stream disassembling part 114. The video packet is decoded into a video signal in a video expanding part 112. Further, (when a command for simultaneously reproducing a still picture is issued) the video signal is synthesized with a video signal of the still picture in a synthesizing part 117, and the resultant signal is output to a video displaying part 110. The audio packet is decoded into an audio signal in an audio expanding part 113 and then output to an audio output part 111. Meanwhile, when reproducing a video signal of a still picture, a JPEG file extracted via the pickup 141 and the reproducing part 116 is transmitted through a still picture expanding part 118. Further, (when a command for simultaneously reproducing a moving picture is issued) the JPEG file is synthesized with a video signal of the moving picture in the synthesizing part 117, and the resultant signal is output to the video displaying part 110. The synthesizing part 117 synthesizes the video signal of an MPEG file with a video signal of the JPEG file by superimposition. When a reproduction command is issued with respect only to one of these pictures, these signals are not synthesized and only one of them is output. These operations are controlled by a reproduction controlling part 231. Further, a reproduction controlling part 232 for a recorder has, in addition to a function of the reproduction controlling part 231, a function of outputting a transport stream through an output timing generating part 120 and the 1394 interface part 121. The output timing generating part 120 computes a buffer occupying amount of a T-STD (Transport Stream Target Decoder) to determine transmission timing with respect to each transport packet.

Furthermore, according to conditions set by a user, the reproduction controlling part 231 and the reproduction controlling part 232 for a recorder allow a moving picture file and a still picture file to be displayed in superimposed relationship in a common screen at arbitrary timing and in arbitrary sizes, respectively. The set conditions are preserved on the phase change optical disk 140 in a text file format based on SMIL (Synchronized Multimedia Integration Language) language that has been under the process of standardization by W3C (World Wide Web Consortium).

An analog interface part 122 is provided for outputting analog video and analog audio to an external device when video and audio are output to the video displaying part 110 and the audio output part 111, respectively.

Figure 3:
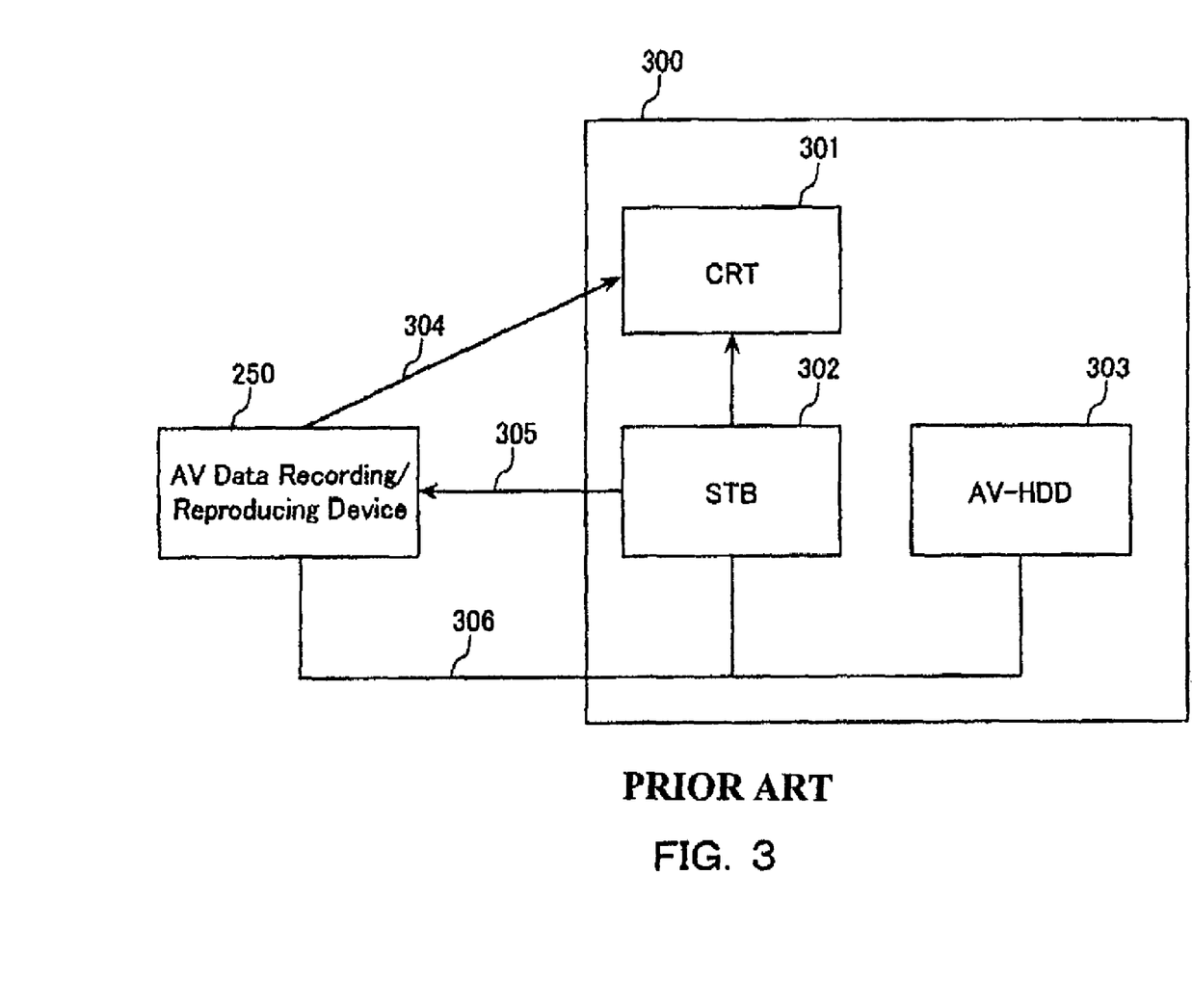
FIG. 3 is a schematic block diagram showing a connection mode between the audio/video data recording/reproducing device and a digital TV.

FIG. 3 is a block diagram showing a connection mode between an audio/video data recording/reproducing device 250 shown in FIG. 2 and a digital TV 300. The digital TV 300 is composed of a CRT (Cathode Ray Tube) 301, an STB (Set Top Box) 302 and an AV-HDD (Hard Disk Drive for Audio/Video use) 303. The audio/video data recording/reproducing device 250, the STB 302 and the AV-HDD 303 are connected to each other through an IEEE 1394 network 306. The STB 302 decodes a broadcasting radio wave and a transport stream received from the IEEE 1394 network 306 and outputs a video signal and an audio signal. The CRT 301 displays the video signal and the audio signal that are output by the STB 302. The AV-HDD 303 records the transport stream received from the IEEE 1394 network 306, and conversely, transmits a transport stream to the IEEE 1394 network 306.

According to the connection mode that has been employed, when viewing a recorded moving picture, the conventional audio/video data recording/reproducing device 250 is connected to the CRT 301 with an analog output cable 304. When recording a moving picture signal output by the STB 302, the STB 302 is connected to the audio/video data recording/reproducing device 250 with an analog input cable 305, in which the connection is established to the video signal input part and the audio signal input part. Further, when connecting a recorded moving file to the AV-HDD 303 via a digital interface, the audio/video data recording/reproducing device 250 is connected to the IEEE 1394 network 306 with a 1394 cable.

The conventional audio/video data recording/reproducing device 250 has presented the following problem. That is, in the audio/video data recording/reproducing device 250, since outputs of digital interfaces such as an IEEE 1394 and the like are limited to recorded contents consisting of a moving picture file alone, files resulting from synthesization of a moving picture file with a still picture file and still pictures only can be viewed via the video displaying part 110 and the analog interface part 122 that are provided in the audio/video data recording/reproducing device.

Thus, the ease of handling the device has been impaired substantially in the following point. That is, when viewing recorded contents of the files resulting from synthesization of a moving picture file with a still picture file and the still pictures on the digital TV 300, it is required that the connection between the audio/video data recording/reproducing device 250 and the digital TV 300 be established through an analog interface. On the other hand, when transmitting the recorded contents to the AV-HDD 303 housed in the digital TV 300 and a personal computer for the purposes of image editing and the like, it is required that the connection be established through a digital interface.

Furthermore, when using the digital interface, the digital TV 300 easily can recognize an audio/video device connected to the 1394 network 306 by utilizing the distributed network technology such as HAVi (Home Audio Video interoperability), Jini or the like. On the contrary, when using the analog interface, it is required that a user manually perform an input port switching operation or the like, which has been disadvantageous.

DISCLOSURE OF THE INVENTION

With the foregoing in mind, it is an object of the present invention to provide an audio/video data recording/reproducing device and method and an audio/video data reproducing device and method for allowing all video and audio signals that can be displayed by a display of the audio/video data recording/reproducing device proper to be output to the exterior through a digital interface. Such video and audio signals are in the forms of, for example, files as recorded including a moving picture file, a still picture file, and a file resulting from synthesizing a moving picture file with a still picture file.

At the same time, the present invention has as another object to realize a user-friendly digital interface that does not require a user to change a connection mode between an audio/video data recording/reproducing device and another audio/video device (for example, a digital TV) depending on an application.

In order to achieve the aforementioned objects, a first audio/video data recording/reproducing device according to the present invention includes a compressed data output part that outputs compressed data that has been recorded to an external device through a digital interface, a reproduction signal output part that outputs a synthesized signal after being subjected to compression, which is obtained by generating an audio/video signal from the compressed data that has been recorded and further adding thereto another audio/video signal, to the external device through the digital interface, a recording part that records the audio/video signal by compression, and a switching part that switches between the compressed data from the compressed data output part and a reproduction signal from the reproduction signal output part.

In the first audio/video data recording/reproducing device, preferably, the compressed data that has been recorded is in a format of an MPEG transport stream, the compressed data output part outputs the MPEG transport stream to the external device, and the reproduction signal output part outputs to the external device the synthesized signal after being subjected to digital video (DV) compression. According to this configuration, the reproduction signal output part can be formed easily.

Alternatively, in the first audio/video data recording/reproducing device, preferably, the compressed data that has been recorded is in a format of an MPEG transport stream, the compressed data output part outputs the MPEG transport stream to the external device, and the reproduction signal output part outputs to the external device, the synthesized signal after being subjected to compression into an MPEG transport stream consisting of an intra-frame prediction encoded image (I picture) alone. According to this configuration, the power consumption of the reproduction signal output part can be suppressed remarkably.

In order to achieve the aforementioned objects, a first audio/video data reproducing device according to the present invention includes a compressed data output part that outputs compressed data that has been recorded to an external device through a digital interface, a reproduction signal output part that outputs a synthesized signal after being subjected to compression, which is obtained by generating a reproduction signal from the compressed data that has been recorded and further adding thereto another signal, to the external device through the digital interface, and a switching part that switches between an output from the compressed data output part and an output from the reproduction signal output part.

In order to achieve the aforementioned objects, a second audio/video data recording/reproducing device according to the present invention includes a transmitting part that transmits an MPEG-2 transport stream, a read-out part that reads out the MPEG-2 transport stream that has been recorded on a recording medium, a compressing part that compresses an audio/video signal to generate the MPEG-2 transport stream, an expanding and synthesizing part that expands the MPEG-2 transport stream to generate the audio/video signal and further synthesizes the audio/video signal with another audio/video signal, a digital interface part that allows the MPEG-2 transport stream to be output to an external device, and a recording part that records the MPEG-2 transport stream on the recording medium. When reproducing the audio/video signal, switching is performed between output of the MPEG-2 transport stream through the read-out part, the transmitting part and the digital interface part and output of the MPEG-2 transport stream through the read-out part, the transmitting part, the expanding and synthesizing part, the compressing part, the transmitting part and the digital interface part. Further, when recording the audio/video signal, the MPEG-2 transport stream is recorded through the compressing part, the transmitting part and the recording part.

In order to achieve the aforementioned objects, a second audio/video data reproducing device according to the present invention includes a transmitting part that transmits an MPEG-2 transport stream, a read-out part that reads out the MPEG-2 transport stream that has been recorded on a recording medium, a compressing part that compresses an audio/video signal to generate the MPEG-2 transport stream, an expanding and synthesizing part that expands the MPEG-2 transport stream to generate the audio/video signal and further synthesizes the audio/video signal with another audio/video signal, and a digital interface part that allows the MPEG-2 transport stream to be output to an external device. Switching is performed between output of the MPEG-2 transport stream through the read-out part, the transmitting part and the digital interface part and output of the MPEG-2 transport stream through the read-out part, the transmitting part, the expanding and synthesizing part, the compressing part, the transmitting part and the digital interface part.

In order to achieve the aforementioned objects, a first method of recording/reproducing audio/video data according to the present invention includes the steps of: outputting compressed data that has been recorded to an external device through a digital interface; outputting a reproduction signal, in which a synthesized signal after being subjected to compression, which is obtained by generating a reproduction signal from the compressed data that has been recorded and further adding thereto another signal, is output to the external device through the digital interface; recording an audio/video signal by compression; and switching between output in the step of outputting the compressed data and output in the step of outputting the reproduction signal.

In the first method of recording/reproducing audio/video data, preferably, the compressed data that has been recorded is in a format of an MPEG transport stream, in the step of outputting the compressed data, the MPEG transport stream is output to the external device, and in the step of outputting the reproduction signal, the synthesized signal after being subjected to digital video (DV) compression is output to the external device.

Alternatively, in the first method of recording/reproducing audio/video data, preferably, the compressed data that has been recorded is in a format of an MPEG transport stream, in the step of outputting the compressed data, the MPEG transport stream is output to the external device, and in the step of outputting the reproduction signal, the synthesized signal after being subjected to compression into an MPEG transport stream consisting of an intra-frame prediction encoded image (I picture) alone is output to the external device.

In order to achieve the aforementioned objects, a first method of reproducing audio/video data according to the present invention includes the steps of: outputting compressed data that has been recorded to an external device through a digital interface; outputting a reproduction signal, in which a synthesized signal after being subjected to compression, which is obtained by generating an audio/video signal from the compressed data that has been recorded and further adding thereto another audio/video signal, is output to the external device through the digital interface; and switching between output in the step of outputting the compressed data and output in the step of outputting the reproduction signal.

In order to achieve the aforementioned objects, a second method of recording/reproducing audio/video data according to the present invention includes the steps of: transmitting an MPEG-2 transport stream; reading out the MPEG-2 transport stream that has been recorded on a recording medium; compressing an audio/video signal to generate the MPEG-2 transport stream; expanding the MPEG-2 transport stream to generate the audio/video signal and further synthesizing the audio/video signal with another audio/video signal; outputting the MPEG-2 transport stream to an external device through a digital interface; and recording the MPEG-2 transport stream on the recording medium. When reproducing the audio/video signal, switching is performed between output of the MPEG-2 transport stream through the steps of reading out, transmitting, and outputting and output of the MPEG-2 transport stream through the steps of reading out, transmitting, expanding and synthesizing, compressing, transmitting, and outputting. Further, when recording the video/audio signal, the MPEG-2 transport stream is recorded through the steps of compressing, transmitting, and recording.

In order to achieve the aforementioned objects, a second method of reproducing audio/video data according to the present invention includes the steps of: transmitting an MPEG-2 transport stream; reading out the MPEG-2 transport stream that has been recorded on a recording medium; compressing an audio/video signal to generate the MPEG-2 transport stream; expanding the MPEG-2 transport stream to generate the audio/video signal and further synthesizing the audio/video signal with another audio/video signal; and outputting the MPEG-2 transport stream to an external device through a digital interface. Switching is performed between output of the MPEG-2 transport stream through the steps of reading out, transmitting, and outputting and output of the MPEG-2 transport stream through the steps of reading out, transmitting, expanding and synthesizing, compressing, transmitting, and outputting.

In order to achieve the aforementioned objects, a third audio/video data reproducing device according to the present invention includes a reproduction signal output part that outputs a still picture signal after being subjected to compression into an MPEG transport stream, which is generated from compressed data that has been recorded, to an external device through a digital interface. In the device, the number of pixels of a video image constituting the MPEG transport stream is changed according to the number of pixels of the still picture signal.

In order to achieve the aforementioned objects, a third method of reproducing audio/video data according to the present invention includes the step of outputting a reproduction signal, in which a still picture signal after being compressed into an MPEG transport stream, which is generated from compressed data that has been recorded, is output to an external device through a digital interface. In the method, the number of pixels of a video image constituting the MPEG transport stream is changed according to the number of pixels of the still picture signal.

According to the third audio/video data reproducing device and method, a still picture can be displayed so as to achieve high picture quality.

According to the aforementioned configurations, all video and audio signals that can be displayed by a display of an audio/video data recording/reproducing device proper can be output to the exterior through a digital interface. Such video and audio signals are in the forms of, for example, files as recorded including a moving picture file, a still picture file, and a file resulting from synthesizing a moving picture file with a still picture file.

BEST MODE FOR CARRYING OUT THE INVENTION

Hereinafter, the present invention will be described by way of an embodiment with reference to the appended drawings.

Embodiment 1

Figure 1:
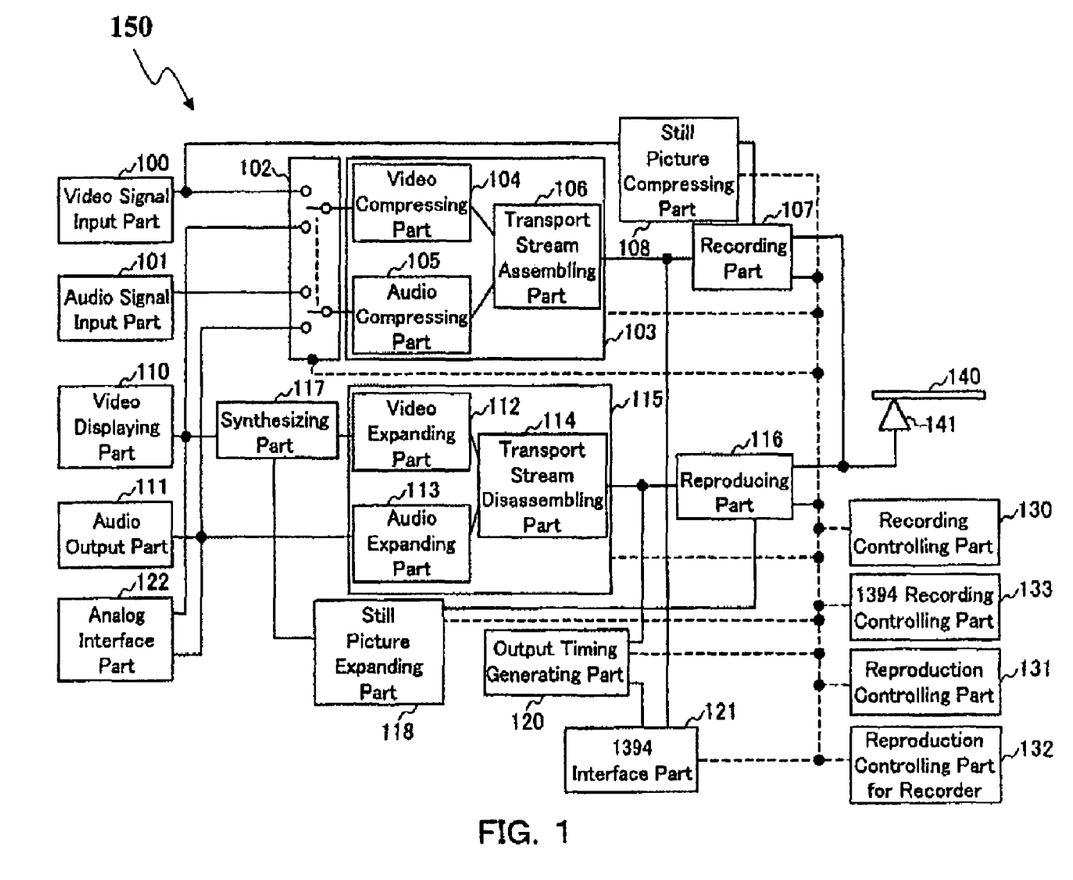
FIG. 1 is a block diagram showing an example of a configuration of an audio/video data recording/reproducing device according to Embodiment 1 of the present invention.

FIG. 1 is a block diagram showing an example of a configuration of an audio/video data recording/reproducing device ISO according to Embodiment 1 of the present invention. This embodiment differs from the conventional device shown in FIG. 2 in that a switch (SW) 102 is added and in that a recording controlling part 130, a reproduction controlling part 131 and a reproduction controlling part 132 for a recorder function differently from those shown in FIG. 2. Other functional parts have the same functions as those described with regard to the conventional device, and thus the following description is directed mainly to the differences.

When operated by a user so that signals input from a video signal input part 100 and an audio signal input part 101 can be recorded, the recording controlling part 130 sets the SW 102 to switch connection to a video input side and an audio input side, respectively, so that the signals are recorded on a phase change optical disk 140 in a format of an MPEG file through a video compressing part 104 and an audio compressing part 105, respectively, and further through a transport stream assembling part 106, a recording part 107 and a pickup 141.

When operated by a user so that the MPEG file recorded on the phase change optical disk 140 can be reproduced to be viewed in a video displaying part 110, and at the same time, viewed by establishing connection to a digital TV via a digital interface, the reproduction controlling part 131 performs the following operation. That is, by the reproduction controlling part 131, the MPEG file is read out through the pickup 141 and a reproducing part 116 to be separated into a video packet and an audio packet by a transport stream disassembling part 114, and further, a video signal and an audio signal are reproduced by a video expanding part 112 and an audio expanding part 113, respectively. In this case, if a command is issued from the reproduction controlling part 131, the video signal is synthesized with another video signal in a synthesizing part 117, and the resultant signal is displayed in the video displaying part 110. Further, at the same time, the reproduction controlling part 131 sets the SW 102 to switch connection to a side of the synthesizing part 117 and a side of the audio expanding part 113. By the reproduction controlling part 131, the reproduced video and audio signals are transmitted through the video compressing part 104 and the audio compressing part 105, respectively, and further, a transport stream is generated by the transport stream assembling part 106 to be output through a 1394 interface part 121.

Figure 4:
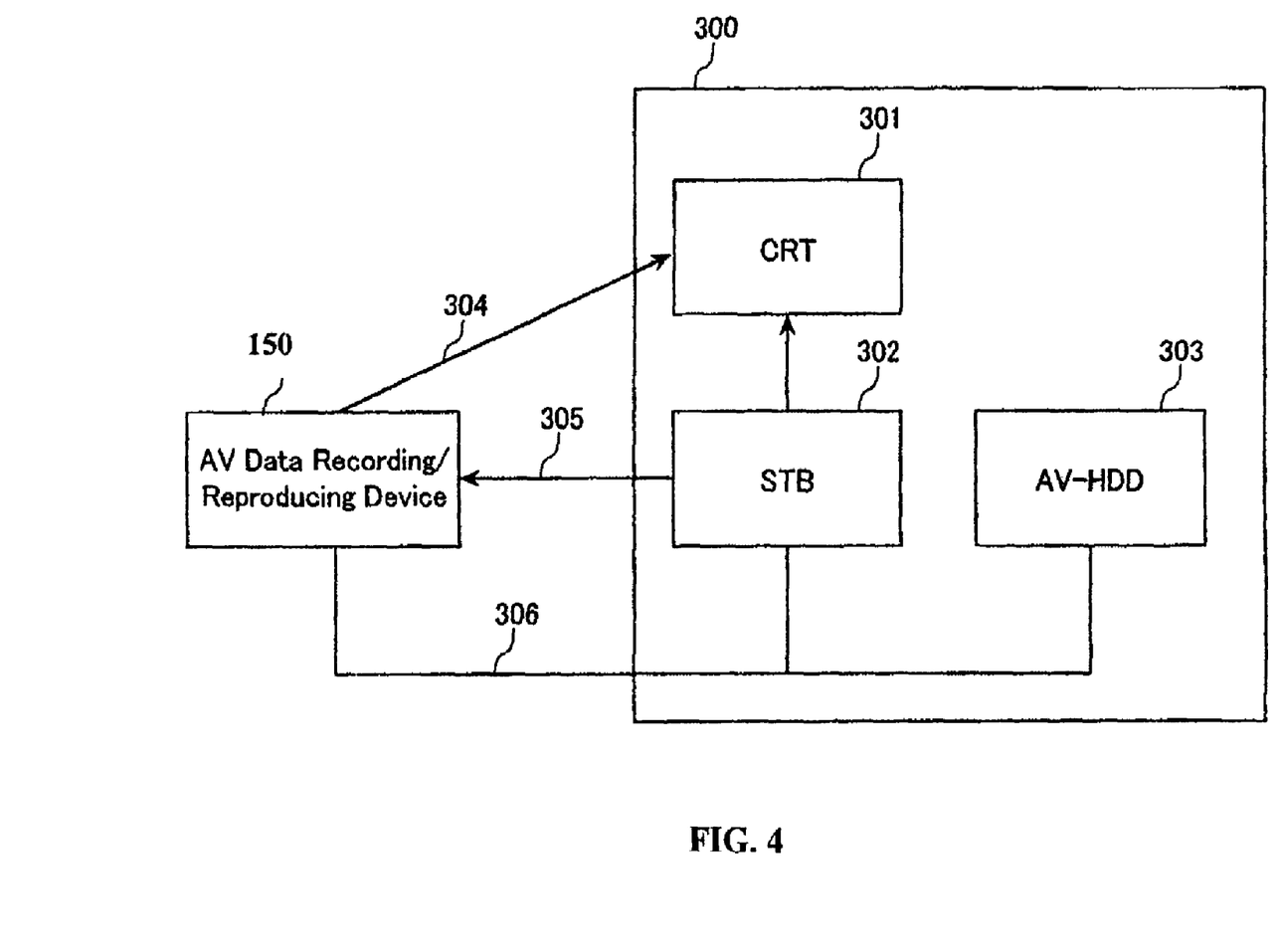
FIG. 4 is a schematic block diagram showing a connection mode between the audio/video data recording/reproducing device and a digital TV.

On the other hand, when operated by the user so that the recorded MPEG file can be reproduced in the video displaying part 110, and at the same time, dubbed by establishing connection to the AV-HDD 303 shown in FIG. 4 through a digital interface, the reproduction controlling part 131 performs the following operation. That is, by the reproduction controlling part 131, a transport stream in the MPEG file that has been read out through the pickup 141 and the reproducing part 116 is output through an output timing generating part 120 and the 1394 interface part 121.

As described above, not only in the case where an original MPEG file as recorded is preserved in, for example, an AV-HDD for the purposes of editing and the like, but also in the case where a JPEG file is viewed on a digital TV and the case where a moving picture operated so that an MPEG file and a JPEG file are reproduced in superimposed relation is viewed on the digital TV, the following can be achieved. That is, these files can be displayed without changing a connection mode using a 1394 cable, so that it is no longer necessary to use an analog interface for connection. Thus, a 1394 interface of an audio/video data recording/reproducing device can be improved remarkably in ease of handling, and complete replacement of an analog interface can be achieved functionally. In addition, this configuration is more advantageous than a configuration using an analog interface in that an original video image can be transmitted through a digital interface without incurring deterioration in picture quality.

In this embodiment, the synthesizing part 117 was to synthesize still pictures only. However, the synthesizing part 117 may be configured to synthesize letters and numerals in an OSD (On Screen Display) mode so as to form a recording date, a frame counter, a menu selected by a user and the like.

Furthermore, in this embodiment, an audio signal to be output from the audio expanding part 113 was not synthesized with any signal. However, such an audio signal may be synthesized with another signal. For example, synthesis with an audio signal obtained in the following manner may be possible. That is, an audio file that has been recorded on the phase change optical disk 140 is read out separately and expanded into the audio signal. In this case, an audio signal resulting from the synthesization is compressed by an encoder 103 composed of the video compressing part 104, the audio compressing part 105 and the transport stream assembling part 106 and output through the 1394 interface part 121. These audio signals are synthesized, and thus two tracks of audio signals consisting of audio of an MPEG file and audio of an audio file can be reduced to one track, thereby allowing even a digital TV capable of reproducing only one track of signals to reproduce two tracks of audio signals.

Furthermore, in this embodiment, an optical disk (the phase change optical disk 140) was used as a storage medium. However, the storage medium may be any of optical disks including, for example, a DVD-RAM, a MO (magneto-optical disk), a DVD-R, a DVD-RW, a DVD+RW, a CD-R, and a CD-RW and hard disks as long as the medium has a general disk shape.

Similarly, in this embodiment, the pickup was used as a reading/writing head. However, as the reading/writing head, a pickup and a magnetic head are used in the case of using a MO, and a magnetic head is used in the case of using a hard disk.

Furthermore, in this embodiment, the files were managed according to the UDF file system. However, file management may be performed according to the FAT (File Allocation Table) and other original file systems.

Furthermore, in this embodiment, the encoder for compressing signals from the video signal input part 100 and the audio signal input part 101 was the same (the encoder 103) as the encoder for compressing signals of the synthesizing part 117 and the audio expanding part 113. However, these operations may be performed by separate encoders.

Furthermore, in this embodiment, the encoder for compressing signals from the video signal input part 100 and the audio signal input part 101 was the same (the encoder 103) as the encoder for compressing signals of the synthesizing part 117 and the audio expanding part 113, and in each case, an MPEG transport stream was generated. However, the following configuration also may be possible. That is, these operations are performed by separate encoders, and the encoder for compressing signals of the synthesizing part 117 is a DV (Digital Video) encoder used for consumer digital VTRs. In this configuration, a DV stream generated by DV compression may be output to the exterior through the 1394 interface part 121. This is made possible by the ability of a 1394 interface to transmit DV streams as well as transport streams. In this case, it is required as a precondition that a digital TV be capable of reproducing DV streams. Further, in this case, the (MPEG) encoder 103 and an (MPEG) decoder 115 may be formed of a codec. According to this configuration, it is no longer necessary to operate the MPEG encoder and the MPEG decoder at the same time, thereby allowing a system to be configured more easily.

Further, in this embodiment, signals of the synthesizing part 117 and the audio expanding part 113 were output to an exterior through the encoder 103 and the 1394 interface part 121. However, at the same time, the signals may be recorded on the phase change optical disk 140 through the recording part 107 and the pickup 141. In this case, reproduction and recording are performed at the same time, and thus it is required that consideration be given to a configuration of the device based on a reading speed, a writing speed, a buffer memory capacity of the recording part 107, a buffer memory capacity of the reproducing part 116, access time and the like.

Furthermore, in this embodiment, although not mentioned specifically, an MPEG picture structure obtained after a recorded transport stream was expanded and then compressed again in the video compressing part 104 in reproducing video images may be formed in the following manner. That is, when the compressed transport stream is to be output to the 1394 interface, the transport stream may be compressed so as not to allow B pictures (Bidirectionally-coded pictures) to be mixed therein in order to reduce delay time attributable to reordering of the B pictures. Furthermore, the compression may be performed so that a higher transmission rate is obtained accordingly after the compression. Moreover, in order to reduce the power consumption of the MPEG encoder in reproducing video images, the compression may be performed so that P pictures (Predictive-coded pictures) and the B pictures are not allowed to be mixed in the transport stream. When the transport stream is composed of I pictures (Intra-coded pictures) alone, a power consumption level corresponding to a power consumption level of a DV encoder can be realized.

Furthermore, in this embodiment, it was newly made possible to output an audio/video signal to a digital interface, which was in either of the forms of a file resulting from synthesization of a moving picture file with a still picture file and a still picture file. However, it should not be necessary to mention, other video images that can be output include special reproduction video images (fast forwarding, fast rewinding, slow-motion reproduction, reverse slow-motion reproduction, jog reproduction, reverse jog reproduction, zoom reproduction) of an MPEG file recorded on a phase change optical disk, video images of a JPEG file reproduced on a multi-screen, a video image obtained by applying the effect of special reproduction (a sepia filter, a transition filter or the like) to an MPEG file or a JPEG file, and video images for, for example, user interfaces such as a button, a pull-down menu and the like. Further, in this case, needless to say, it is required that the decoder 115 and a still picture expanding part 118 have functions adapted to these video images.

Furthermore, in this embodiment, the video signal input part 100 and the audio signal input part 101 may be in the form of a camera of an audio/video data recording/reproducing part, a tuner, or an analog interface for external input.

Furthermore, in this embodiment, when recorded, a still picture file of, for example, 1,280 (horizontal) by 960 (vertical) pixels, was compressed according to MP@ML (Main-Profile, Main Level) MPEG-2. However, the still picture may be compressed into a progressive video image of 1,920 by 1,080 pixels according to MP@HL (Main-Profile, High-Level). This allows a still picture to be displayed so as to achieve high picture quality. Needless to say, in this case, it is required that aspect adjustment and zooming be performed with respect to the video image. Herein, the number of pixels 1,920 by 1,080 corresponds to that of the BS digital broadcasting in Japan.

Furthermore, when a still picture file is converted to a transport stream, only one I picture is output, and thus it is no longer necessary to generate P pictures and B pictures in a frame cycle as in the case of a moving picture file. That is, a video stream included in the transport stream may be composed only of a sequence start code, an I picture and a sequence end code.

Furthermore, in this embodiment, the encoder 103 and the decoder 115 were provided individually. However, these components may be integrated as long as they operate at the same time.

As described above, the present invention can realize an audio/video data recording/reproducing device for allowing all video and audio signals that can be displayed by a display of an audio/video data recording device proper to be output to the exterior through a digital interface. Such video and audio signals are in the forms of, for example, files as recorded including a moving picture file, a still picture file, and a file resulting from synthesization of a moving picture file with a still picture file.

Furthermore, at the same time, the present invention can realize a user-friendly digital interface that does not require a user to change a connection mode between an audio/video data recording/reproducing device and another audio/video device (for example, a digital TV) depending on an application.

Moreover, by the use of a protocol such as HAVi, Jini or the like in combination with a digital interface, a digital TV can recognize an audio/video data recording/reproducing device connected thereto automatically. Thus, for example, when connection to a digital TV is established so that a movie can be viewed after shooting, this function of automatically recognizing a connected device allows a user to enjoy handling ease all the time, which is enhanced far more than in the case of using an analog interface.

The invention claimed is:

1. An audio/video data recording/reproducing device, comprising:
   a compressed data output part that outputs compressed data that has been recorded to an external device through a digital interface;
   a reproduction signal output part that outputs a synthesized signal after being subjected to compression, which is obtained by expanding the compressed data that has been recorded to generate an audio/video signal, then further adding thereto another audio/video signal to generate a combined signal, and subjecting the combined signal to compression to provide the synthesized signal, to the external device through the digital interface;
   a recording part that records the audio/video signal by compression; and
   a switching part that switches between an output from the compressed data output part and an output from the reproduction signal output part.

2. The audio/video data recording/reproducing device according to claim 1, wherein the compressed data that has been recorded is in a format of an MPEG transport stream, the compressed data output part outputs the MPEG transport stream to the external device, and the reproduction signal output part outputs to the external device the synthesized signal after being subjected to digital video (DV) compression.

3. The audio/video data recording/reproducing device according to claim 1, wherein the compressed data that has been recorded is in a format of an MPEG transport stream, the compressed data output part outputs the MPEG transport stream to the external device, and the reproduction signal output part outputs to the external device, the synthesized signal after being subjected to compression into an MPEG transport stream consisting of an intra-frame prediction encoded image (I picture) alone.

4. An audio/video data reproducing device, comprising:
a compressed data output part that outputs compressed data that has been recorded to an external device through a digital interface;
a reproduction signal output part that outputs a synthesized signal after being subjected to compression, which is obtained by expanding the compressed data that has been recorded to generate a reproduction signal, then further adding thereto another reproduction signal to generate a combined signal, and subjecting the combined signal to compression to provide the synthesized signal, to the external device through the digital interface; and
a switching part that switches between an output from the compressed data output part and an output from the reproduction signal output part.

5. An audio/video data recording/reproducing device, comprising:
a transmitting part that transmits an MPEG-2 transport stream;
a read-out part that reads out the MPEG-2 transport stream that has been recorded on a recording medium;
a compressing part that compresses an audio/video signal to generate the MPEG-2 transport stream;
an expanding and synthesizing part that expands the MPEG-2 transport stream to generate the audio/video signal and further synthesizes the audio/video signal with another audio/video signal;
a digital interface part that allows the MPEG-2 transport stream to be output to an external device; and
a recording part that records the MPEG-2 transport stream on the recording medium, wherein when reproducing the audio/video signal, switching is performed between output of the MPEG-2 transport stream through the read-out part, the transmitting part and the digital interface part and output of the MPEG-2 transport stream through the read-out part, the transmitting part, the expanding and synthesizing part, the compressing part, the transmitting part and the digital interface part, and when recording the audio/video signal, the MPEG-2 transport stream is recorded through the compressing part, the transmitting part and the recording part.

6. An audio/video data reproducing device, comprising:
a transmitting part that transmits an MPEG-2 transport stream;
a read-out part that reads out the MPEG-2 transport stream that has been recorded on a recording medium;
a compressing part that compresses an audio/video signal to generate the MPEG-2 transport stream;
an expanding and synthesizing part that expands the MPEG-2 transport stream to generate the audio/video signal and further synthesizes the audio/video signal with another audio/video signal; and
a digital interface part that allows the MPEG-2 transport stream to be output to an external device, wherein switching is performed between output of the MPEG-2 transport stream through the read-out part, the transmitting part and the digital interface part and output of the MPEG-2 transport stream through the read-out part, the transmitting part, the expanding and synthesizing part, the compressing part, the transmitting part and the digital interface part.

7. A method of recording/reproducing audio/video data, comprising the steps of:
outputting compressed data that has been recorded to an external device through a digital interface;
outputting a reproduction signal, in which a synthesized signal after being subjected to compression, which is obtained by expanding the compressed data that has been recorded to generate an audio/video signal, then further adding thereto another audio/video signal to generate a combined signal, and subjecting the combined signal to compression to provide the synthesized signal, is output to the external device through the digital interface;
recording an audio/video signal by compression; and
switching between output in the step of outputting the compressed data, and output in the step of outputting the reproduction signal.

8. The method of recording/reproducing audio/video data according to claim 7, wherein the compressed data that has been recorded is in a format of an MPEG transport stream, in the step of outputting the compressed data, the MPEG transport stream is output to the external device, and in the step of outputting the reproduction signal, the synthesized signal after being subjected to digital video (DV) compression is output to the external device.

9. The method of recording/reproducing audio/video data according to claim 7, wherein the compressed data that has been recorded is in a format of an MPEG transport stream, in the step of outputting the compressed data, the MPEG transport steam is output to the external device, and in the step of outputting the reproduction signal, the synthesized signal after being subjected to compression into an MPEG transport stream consisting of an intra-frame prediction encoded image (I picture) alone is output to the external device.

10. A method of reproducing audio/video data, comprising the steps of:
outputting compressed data that has been recorded to an external device through a digital interface;
outputting a reproduction signal, in which a synthesized signal after being subjected to compression, which is obtained by expanding the compressed data that has been recorded to generate a reproduction signal, then further adding thereto another reproduction signal to generate a combined signal, and subjecting the combined signal to compression to provide the synthesized signal, is output to the external device through the digital interface; and
switching between output in the step of outputting the compressed data and output in the step of outputting the reproduction signal.

11. A method of recording/reproducing audio/video data, comprising the steps of:
transmitting an MPEG-2 transport stream;
reading out the MPEG-2 transport stream that has been recorded on a recording medium;

compressing an audio/video signal to generate the MPEG-2 transport stream; expanding the MPEG-2 transport stream to generate the audio/video signal and further synthesizing the audio/video signal with another audio/video signal;

outputting the MPEG-2 transport stream to an external device through a digital interface; and recording the MPEG-2 transport stream on the recording medium, wherein when reproducing the audio/video signal, switching is performed between output of the MPEG-2 transport steam through the steps of reading out, transmitting, and outputting and output of the MPEG-2 transport stream through the steps of reading out, transmitting, expanding and synthesizing, compressing, transmitting, and outputting, and when recording the video/audio signal, the MPEG-2 transport stream is recorded through the steps of compressing, transmitting, and recording.

12. A method of reproducing audio/video data, comprising the steps of:

transmitting an MPEG-2 transport stream;

reading out the MPEG-2 transport stream that has been recorded on a recording medium;

compressing an audio/video signal to generate the MPEG-2 transport stream;

expanding the MPEG-2 transport stream to generate the audio/video signal and further synthesizing the audio/video signal with another audio/video signal; and outputting the MPEG-2 transport stream to an external device through a digital interface, wherein switching is performed between output of the MPEG-2 transport stream through the steps of reading out, transmitting, and outputting and output of the MPEG-2 transport stream through the steps of reading out, transmitting, expanding and synthesizing, compressing, transmitting, and outputting.

* * * * *